(12) United States Patent
Kimura et al.

(10) Patent No.: US 9,158,955 B2
(45) Date of Patent: Oct. 13, 2015

(54) CODE SYMBOL READING APPARATUS, CODE SYMBOL READING METHOD AND MEDIUM

(71) Applicant: Optoelectronics Co., Ltd., Saitama (JP)

(72) Inventors: Kazuto Kimura, Saitama (JP); Zhihui Duan, Saitama (JP)

(73) Assignee: Optoelectronics Co., Ltd., Saitama (JP)

( * ) Notice: Subject to any disclaimer, the term of this patent is extended or adjusted under 35 U.S.C. 154(b) by 69 days.

(21) Appl. No.: 13/940,633

(22) Filed: Jul. 12, 2013

(65) Prior Publication Data

US 2014/0034733 A1 Feb. 6, 2014

(30) Foreign Application Priority Data

Jul. 13, 2012 (JP) .................. 2012-157073

(51) Int. Cl.
*G06K 7/10* (2006.01)
*G06K 7/14* (2006.01)

(52) U.S. Cl.
CPC .......... *G06K 7/1465* (2013.01); *G06K 7/10851* (2013.01)

(58) Field of Classification Search
CPC .......... G06K 7/10581; G06K 7/10544; G06K 7/1465
USPC .................. 235/455, 462.06, 462.15, 462.25, 235/462.29
See application file for complete search history.

(56) References Cited

U.S. PATENT DOCUMENTS

| | | | | |
|---|---|---|---|---|
| 5,378,883 A * | 1/1995 | Batterman et al. | ........ | 235/462.21 |
| 5,852,286 A * | 12/1998 | Coleman | .................. | 235/462.01 |
| 6,568,597 B2 * | 5/2003 | Krichever et al. | ........ | 235/462.32 |
| 6,874,688 B1 * | 4/2005 | Barkan | .................... | 235/462.25 |
| 8,087,589 B2 * | 1/2012 | Heinrich et al. | ......... | 235/462.29 |
| 2002/0117547 A1 * | 8/2002 | Krichever | ................ | 235/462.01 |
| 2004/0004127 A1 * | 1/2004 | Nakamura et al. | ........ | 235/462.26 |
| 2006/0065734 A1 * | 3/2006 | Sackett et al. | ............ | 235/462.25 |
| 2009/0084853 A1 * | 4/2009 | Giebel et al. | ............ | 235/462.36 |
| 2009/0114727 A1 * | 5/2009 | Heinrich et al. | ......... | 235/462.25 |
| 2010/0219246 A1 * | 9/2010 | Nakamura | .................... | 235/454 |
| 2010/0295946 A1 * | 11/2010 | Reed et al. | .................... | 348/164 |

FOREIGN PATENT DOCUMENTS

JP 2003-308476 A 10/2003

* cited by examiner

*Primary Examiner* — Paultep Savusdiphol

(74) *Attorney, Agent, or Firm* — Brundidge & Stanger, P.C.

(57) ABSTRACT

A code symbol reading apparatus, that reads a code symbol on an object to be read by scanning the object, repeats trial to read the code symbol until the apparatus succeeds in reading, while changing a transmission frequency of a filter that processes a signal representing a light intensity variation obtained through the scan and in which transmittance depends on a frequency of the signal.

6 Claims, 8 Drawing Sheets

Fig. 5

| PARAMETER ID | 1 | 2 | 3 | 4 | 5 | 6 |
|---|---|---|---|---|---|---|
| CUT-OFF FREQUENCY | 108KHz | 108KHz | 65KHz | 43KHz | 32.5KHz | 21.7KHz |

Fig. 6

SETTING ORDER OF FREQUENCY

1 → 2 → 3 → 4 → 5 → 6

CODE SYMBOL READING APPARATUS, CODE SYMBOL READING METHOD AND MEDIUM

FIELD

The invention relates to a code symbol reading apparatus and a code symbol reading method of reading a code symbol on an object to be read by scanning the object, and non-transitory machine-readable medium containing program instructions executable by a computer for enabling the computer to control the code symbol reading apparatus.

BACKGROUND

Conventionally, there is known a code symbol reading apparatus that reads a code symbol such as a barcode on an object to be read by scanning the object. In the code symbol reading apparatus as above, a spot of laser beam is irradiated so as to move on the object to be read, and an intensity of reflected light from the object is detected in time-series and analyzed, to thereby obtain information regarding how portions with high reflectance (white bars) and portions with low reflectance (black bars) are arranged.

As such a code symbol reading apparatus, one described in JP 2003-308476 A (PTL1), for example, is known.

The code symbol reading apparatus described in PTL1 pulse-drives a laser diode at a frequency of about 2 MHz, and performs a synchronous detection between a signal of reflected light and an output pulse of an oscillator used for performing the pulse-driving, to thereby cut an input noise.

SUMMARY

Incidentally, in recent years, an LED (light-emitting diode) illumination is becoming widely used as an illumination that did not exist in the past. Further, it is often the case that the LED illumination emits pulsed light in a blinking period at about 20 to 60 KHz (kilohertz).

Meanwhile, in a code symbol reading apparatus that scans an object to be read to read a code symbol, an intensity of reflected light is detected in time-series, as described above. Further, when an LED illumination is used at the time of the reading, an intensity of environmental light that is incident on a photodiode for the detection of the reflected light largely varies periodically due to the emission of pulsed light. Accordingly, a problem such that a light intensity variation between reflected light from portions with high reflectance and reflected light from portions with low reflectance of code symbol is masked, and thus a proper reading cannot be conducted, becomes obvious.

For example, when a barcode symbol with a resolution of 10 mm is read at a depth of field of 100 mm, under an illumination with no blinking in a period similar to that of the barcode, a waveform as illustrated in FIG. 9 is obtained.

This waveform is obtained by adjusting a level of a signal representing an intensity of reflected light, and then taking a differential value of the resultant. A peak that rises upward indicates a change from a black bar to a white bar, and a peak that falls downward indicates a change from a white bar to a black bar.

However, when a similar reading is performed under the LED illumination, a waveform to be obtained becomes one as illustrated in FIG. 10.

Specifically, peaks of light intensity variation caused by a periodical blinking of the LED illumination appear in the entire scanning period, and cover and hide the peaks that reflect the arrangement of bars of the barcode symbol. Therefore, it is not possible to obtain a read signal that reflects the arrangement of bars, and it is also not possible to decode the barcode symbol.

On the contrary, by using the technique described in PTL1, it is possible to effectively remove a noise at a frequency different from an oscillation frequency of the oscillator, with the use of the synchronous detection. However, the technique described in PTL1 has a problem such that a large-scale circuit which increases cost is required for driving the laser diode and for performing the synchronous detection.

The invention is made based on the background as above, and an object thereof is to make it possible to read a code symbol in an inexpensive manner and with good accuracy, even under an illumination that emits pulsed light such as an LED illumination.

To attain the above object, a code symbol reading apparatus of the invention is a code symbol reading apparatus that reads a code symbol on an object to be read by scanning the object, including a filter that processes a signal representing a light intensity variation obtained through the scan, transmittance of the filter depending on frequency of the signal, wherein the code symbol reading apparatus repeats trial to read the code symbol, while changing a transmission frequency of the filter, until the code symbol reading apparatus succeeds in the reading.

It is conceivable that the code symbol reading apparatus further includes a memory that stores value of the transmission frequency of the filter which was used when the code symbol reading apparatus succeeded in reading the code symbol before, and the code symbol reading apparatus uses the value stored in the memory as an initial value of the transmission frequency of the filter.

Further, it is also conceivable that the code symbol reading apparatus includes a measuring device that measures period of light intensity variation of an external light, and the code symbol reading apparatus sets an initial value of the transmission frequency of the filter based on the period measured by the measuring device.

The invention can be implemented in an arbitrary configuration such as system, method, program, non-transitory storage medium, or the like other than the above described devices.

The above and other objects, features and advantages of the invention will be apparent from the following detailed description which is to be read in conjunction with the accompanying drawings.

According to the code symbol reading apparatus and the code symbol reading method of the invention as described above, a code symbol can be read in an inexpensive manner and with good accuracy, even under an illumination that emits pulsed light such as an LED illumination.

Further, according to the program of the invention, it is possible to achieve a similar effect by making a computer read and execute the program.

BRIEF DESCRIPTION OF THE DRAWINGS

FIG. 5 is a diagram illustrating examples of candidates of cut-off frequency set in the processing in FIG. 4.

FIG. 6 is a diagram illustrating a setting order of the cut-off frequency.

DETAILED DESCRIPTION

Hereinafter, embodiments to implement the invention will be concretely described based on the drawings.

Figure 1:
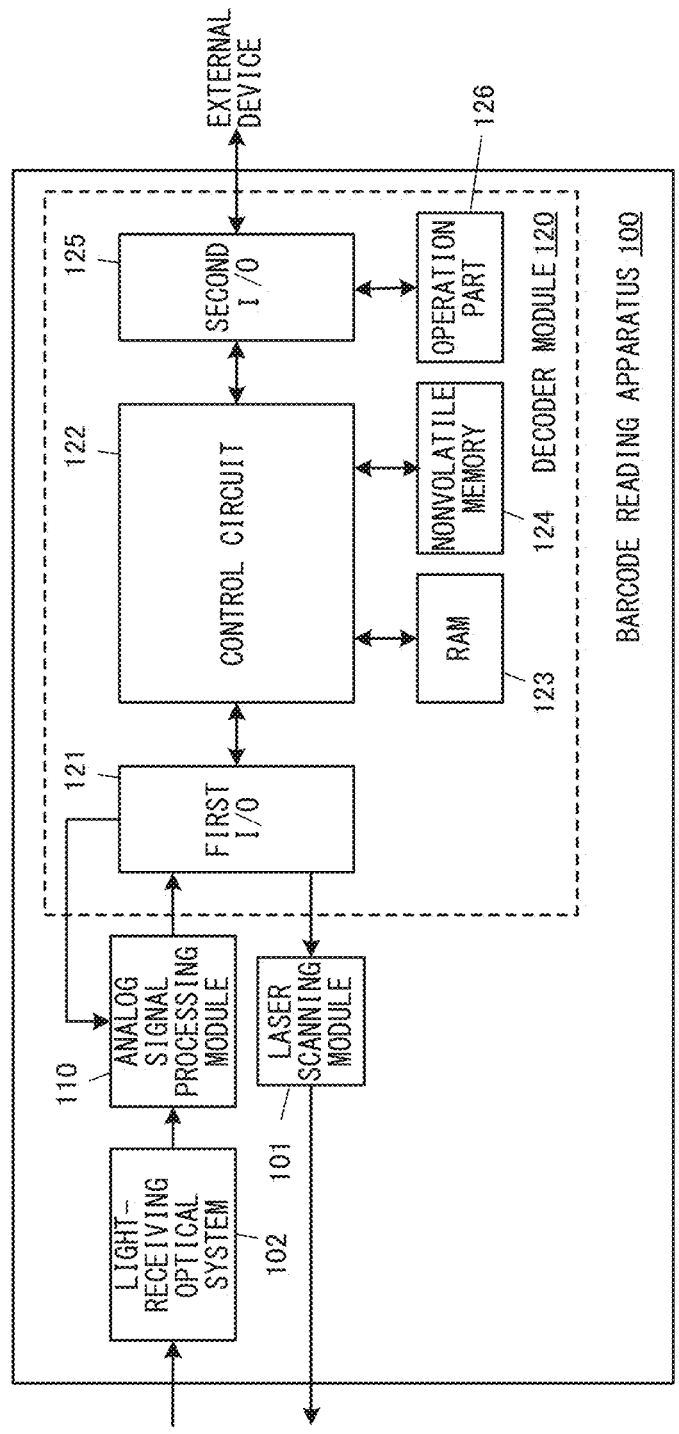
FIG. 1 is a diagram illustrating a hardware configuration of a barcode reading apparatus being one embodiment of a code symbol reading apparatus of the invention.

First, FIG. 1 illustrates a hardware configuration of a barcode reading apparatus being one embodiment of a code symbol reading apparatus of the invention.

The barcode reading apparatus 100 is an apparatus that reads a code symbol on an object to be read by scanning the object, and includes a laser scanning module 101, a light-receiving optical system 102, an analog signal processing module 110, and a decoder module 120.

Among the above, the laser scanning module 101 includes a laser light source, and outputs a laser beam that scans the object to be read.

The light-receiving optical system 102 is an optical module for leading incident light which is incident on the barcode reading apparatus 100 from the outside including reflected light from the object to be read, to a photoelectric conversion module 111 included in the analog signal processing module 110, and the light-receiving optical system 102 includes a lens and a mirror according to need.

As will be described in detail using FIG. 2, the analog signal processing module 110 converts light which is incident through the light-receiving optical system 102 into an electrical signal, performs analog signal processing on the electrical signal, and eventually binarizes the processed signal to provide the resultant to processing in the decoder module 120.

Next, the decoder module 120 includes a first input/output interface (first I/O) 121, a control circuit 122, a RAM 123, a nonvolatile memory 124, a second input/output interface (second I/O) 125, and an operation part 126.

Among the above, the first I/O 121 is an interface for performing transmission/reception of a binarized read signal, a setting signal of parameter with respect to the analog signal processing module 110 and the like, between the analog signal processing module 110 and the decoder module 120.

The control circuit 122 performs control of the laser scanning module 101 and the analog signal processing module 110. The control circuit further performs decode processing of barcode symbol, output processing of a result of reading after the decode and the like with respect to the binarized read signal input from the analog signal processing module 110 via the first I/O 121. The control circuit 122 can be configured using an ASIC (Application Specific Integrated Circuit) or a CPU as hardware. Note that regarding details of the decode processing, a well-known method may be appropriately adopted.

The RAM 123 is a memory used as a work memory when performing the decode processing, temporarily accumulating the result of reading after the decode, and storing, other than the result of reading, data which dynamically changes such as data required for the operation of the barcode reading apparatus 100. A part of the RAM 123 may be formed as a nonvolatile memory.

The nonvolatile memory 124 is a nonvolatile memory storing a program for activating the barcode reading apparatus 100, a program to be executed by the CPU of the control circuit 122, a value of parameter to be set in the analog signal processing module 110 and the like.

The second I/O 125 is an interface for conducting data communication with an external device such as a PC (personal computer), and the result of reading after the decode performed by the control circuit 122 can be outputted to the external device via the second I/O 125. Further, the second I/O 125 is also an interface between the control circuit 122 and the operation part 126.

The operation part 126 is an operation device for accepting instructions regarding a start of reading of barcode, a selection of reading mode and the like, and includes a trigger, a button, a display and the like according to need.

Figure 2:
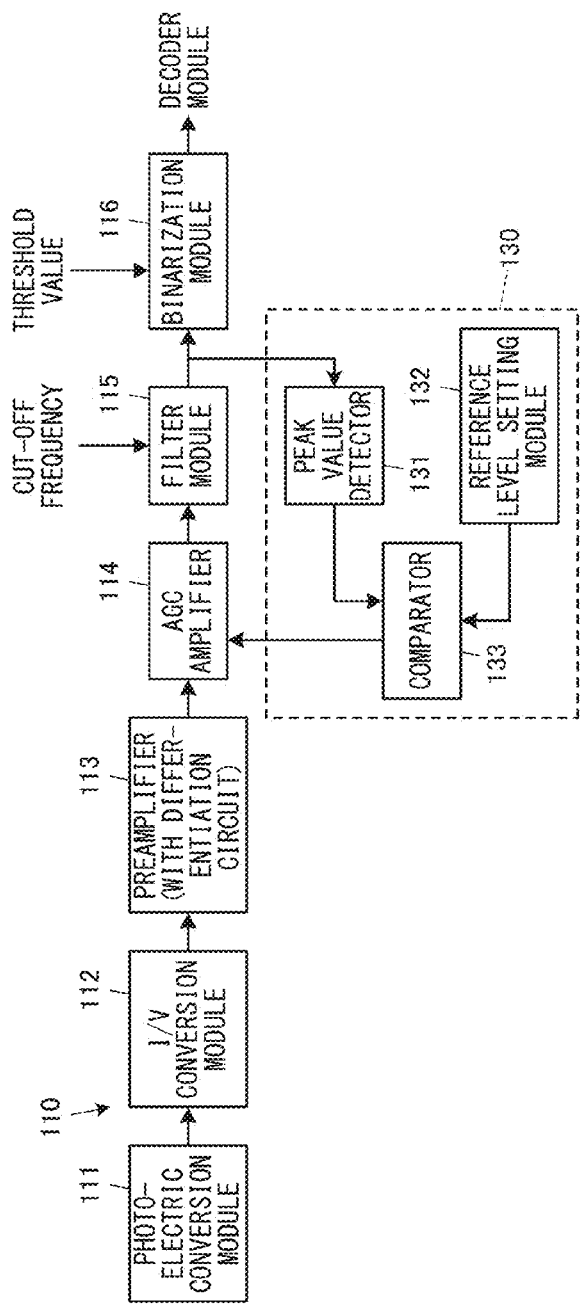
FIG. 2 is a diagram illustrating a configuration of an analog signal processing module illustrated in FIG. 1 in more detail.

Next, FIG. 2 illustrates a configuration of the analog signal processing module 110 in more detail.

As illustrated in FIG. 2, the analog signal processing module 110 includes the photoelectric conversion module 111, an I/V conversion module 112, a preamplifier 113, an automatic gain control (AGC) amplifier 114, a filter module 115, a binarization module 116, and a gain control signal generation module 130.

Among the above, the photoelectric conversion module 111 includes a photodiode, and converts light that is incident through the light-receiving optical system 102 into an electrical signal. The electrical signal is a signal representing, in real time, a light intensity of light including the reflected light from the object to be read and disturbance light received by the photodiode. Therefore, it can be said that the electrical signal is a signal representing a light intensity variation, when seen in time-series.

The I/V conversion module 112 converts a current signal outputted from the photoelectric conversion module 111 into a voltage signal.

The preamplifier 113 amplifies the voltage signal converted by the I/N conversion part 112. The preamplifier 113 includes a differential circuit, and outputs a differential signal of the amplified voltage signal. By the differential circuit, the input signal can be made to be a signal in which a portion where the light intensity varies is emphasized.

In the AGC amplifier 114, the differential signal outputted from the preamplifier 113 is inputted, and the AGC amplifier 114 amplifies the signal by a gain controlled in accordance with a level of an output signal of the filter module 115 at a subsequent stage.

The filter module 115 is a band-pass filter to which a signal outputted from the AGC amplifier 114 is inputted, and performs filtering process on the inputted signal as follows. The filter module 115 allows inputted signals in a transmission frequency band in accordance with a cut-off frequency set by the control circuit 122 via the first I/O 121 to transmit therethrough, and the filter module 115 attenuates inputted signals in a band other than the transmission frequency band.

Figure 3:
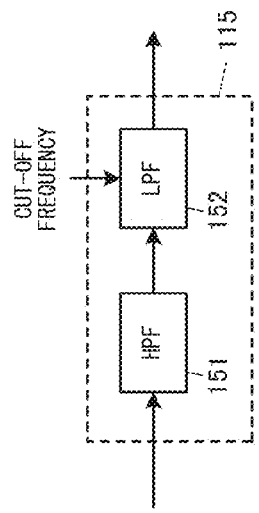
FIG. 3 is a diagram illustrating a configuration of a filter module illustrated in FIG. 2 in more detail.

This function is realized by a configuration illustrated in FIG. 3. Specifically, an input signal into the filter module 115 is output through a high-pass filter (HPF) 151 and a low-pass filter (LPF) 152. Further, in this example, it is set that a cut-off frequency in the HPF 151 is fixed, and a transmission frequency in the filter part 115 is practically set in accordance with a cut-off frequency in the LPF 152. Note that it is also possible to design such that the cut-off frequency in the HPF 151 can also be changed.

Returning to the explanation of FIG. 2, the next binarization module 116 binarizes an analog signal being an output signal of the filter module 115 using a threshold value set by the control circuit 122 via the first I/O 121, and outputs the resultant to the decoder module 120 that reads information of barcode symbol. Note that the binarization performed here is generating a binary signal such that the binary signal initially starts with a signal value of 0 corresponding to a background of code (white), the signal value changes from 0 to 1 when a negative peak with a size exceeding a threshold value appears, and the signal value changes from 1 to 0 when a positive peak with a size exceeding a threshold value appears, based on the output signal of the filter module 115.

Further, the gain control signal generation module 130 includes a peak value detector 131 that detects a peak value of an output signal waveform of the filter module 115, a reference level setting device 132 that outputs a voltage signal at a reference level, and a comparator 133. Further, the comparator 133 compares the peak value of the output signal waveform of the filter module 115 detected by the peak value detector 131 and the reference level outputted from the reference level setting device 132, and thereby generates a gain control signal that controls a gain in the AGC amplifier 114.

The photodiode in the photoelectric conversion module 111 converts information of light which is incident through the light-receiving optical system 102 into an electrical signal, the light including reflected light from a barcode symbol. Signal strength of the resultant electrical signal largely differs depending on a distance from the photodiode to the barcode symbol. Further, as will be described later, also when a detection of external light is conducted while turning off the laser light source, the resultant signal strength differs from that of the reflected light.

However, by performing feedback-control of gain in the AGC amplifier 114 using the gain control signal generation module 130, it is possible to set an output signal level of the AGC amplifier 114 to an approximately certain level, without depending on level of the output signal from the photoelectric conversion module 111.

A characteristic point in the above-described barcode reading apparatus 100 is an operation for removing noise caused by an illumination that emits pulsed light (brightness varies in a period close to that of a read signal of barcode) such as an LED illumination. Hereinafter, this point will be described.

When the illumination is the LED illumination, a frequency of blinking is approximately about 20 KHz to about 60 KHz, although it is different depending on manufactures. Therefore, it can be considered that if the transmission frequency in the filter part 115 is adjusted so that a component in the frequency band of approximately about 20 KHz to about 60 KHz does not transmit through the filter part 115, it is possible to remove the noise caused by the LED illumination from the read signal. More concretely, the removal can be realized by setting a value of the cut-off frequency in the LPF 152 at a value smaller than that of the frequency of blinking of the LED illumination, for example.

However, when the resolution of barcode to be read is small, or when a reading distance is long, a signal due to the light intensity variation of reflected light obtained from the barcode symbol to be read also becomes a signal with large frequency. Specifically, the frequency of the signal due to the light intensity variation of reflected light is about 1 KHz when it is small, and is about 100 KHz when it is large.

Therefore, if a component of 10 KHz or more, for example, is cut-off for eliminating the influence of the LED illumination, a band in which the signal of reflected light obtained from the barcode symbol is included is also cut-off. Further, for this reason, a trouble may happen in the reading of fine barcode and the reading at a long distance.

When there is no periodical disturbance light and when the cut-off frequency is 87.6 KHz, a barcode with a resolution of 1.0 mm, for example, can be read up to the depth of field (reading distance) of about 900 mm. However, if the cut-off frequency is set to 21.9 KHz, the barcode can be read up to the depth of field of only about 400 mm.

Therefore, it can be said that a value of the cut-off frequency is preferably set as large as possible within a range in which the noise caused by the blinking of illumination can be eliminated, when performing the reading under the blinking illumination such as the LED illumination.

Accordingly, in the barcode reading apparatus 100, it is designed such that trial to read barcode is repeatedly conducted until the barcode reading apparatus 100 succeeds the reading, while changing the transmission frequency in the filter module 115, more concretely, the cut-off frequency in the LPF 152.

Note that the explanation is made here by citing the case of the LED illumination as an example, but, an inverter-type fluorescent light also blinks at a frequency of about several tens to 100 KHz, for example. When the reading is conducted under an illumination, other than the LED illumination, in which a brightness varies in a period close to that of a read signal of barcode as above, an operation to be described hereinafter is similarly effective.

Hereinafter, concrete processing for realizing this operation will be described.

First Processing Example

FIG. 4 to FIG. 6

Figure 4:
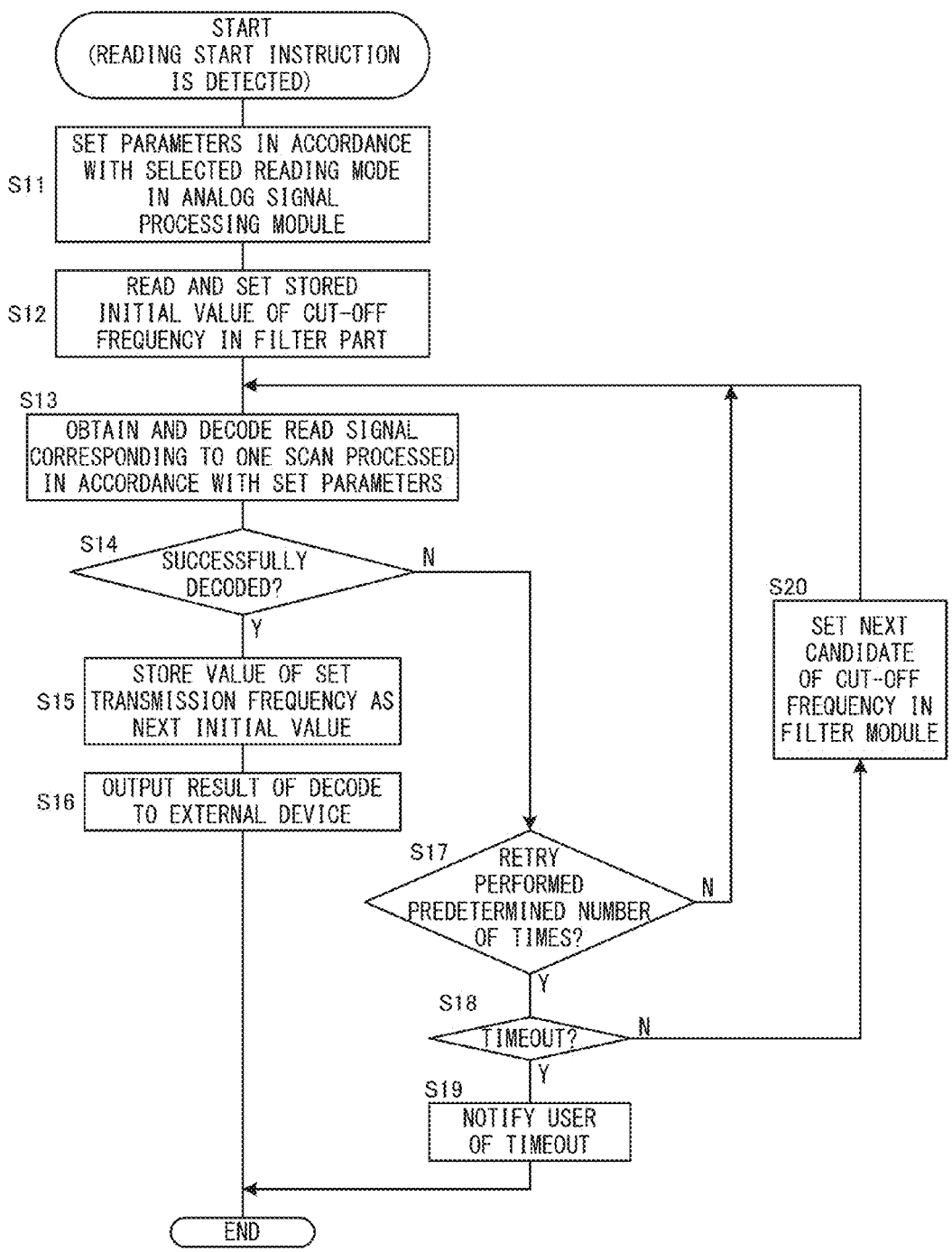
FIG. 4 is a flowchart of a first example of processing executed by a CPU in a control circuit when a reading start instruction is detected.

FIG. 4 illustrates a flowchart of a first example of processing executed by the CPU of the control circuit 122 when a reading start instruction is detected.

Upon detecting an instruction of starting reading of code symbol through an operation of the operation part 126 or the like, the CPU of the control circuit 122 starts the processing illustrated in the flowchart in FIG. 4.

The CPU of the control circuit 122 first sets parameters in accordance with a selected reading mode in the analog signal processing module 110 (S11). The reading mode mentioned here is previously set before starting the processing in FIG. 4, by selecting it in accordance with the operation of the operation part 126 or by selecting it based on a previous measured result. Further, the parameters to be set here are, for example, the cut-off frequency in the LPF 152 and the threshold value for binarization in the binarization module 116.

Further, there are prepared a plurality of the reading modes in accordance with a reading sensitivity. A mode of performing high-sensitive reading is a mode in which the value of the cut-off frequency in the LPF 152 is set at a large value, and the threshold value for binarization is set at a small value so that the reading with a large depth of field can be performed.

However, signals due to a fine blur or stain is also picked up, so that the mode is not good at dealing with the blur, the stain or the like.

On the other hand, a mode of performing low-sensitive reading is a mode in which the value of the cut-off frequency in the LPF 152 is set at a small value, and the threshold value for binarization is set at a large value so that a signal due to a fine blur or stain (a signal of 65 KHz or more, for example) is removed, and reading with a bit small depth of field but which is good at dealing with the blur or the stain can be performed.

Next, the CPU of the control circuit 122 reads a stored initial value of the cut-off frequency, and sets the value in the filter part 115 (S12). The initial value is a value stored in later-described step S15 at a time of previous reading. When nothing is stored such as a time of initial reading, the cut-off frequency in accordance with the reading mode set in step S11 is used as it is.

Next, the CPU obtains and decode a read signal corresponding to one scan which is processed in accordance with the parameters set so far (S13). Further, the CPU judges whether or not the CPU succeeds in the decoding (S14). When the CPU succeeds in the decoding, the CPU stores a value of transmission frequency set at that time in a predetermined memory (the RAM 123, for example) as a next initial value (S15).

Thereafter, the CPU outputs a result of the decoding to the external device (S16), and terminates the processing.

On the other hand, when the CPU fails in the decoding in step S14, the CPU judges whether or not a number of times of retry reaches a predetermined number of times (S17). When the number of times of retry does not reach the predetermined number of times, the CPU repeats the processing by returning to step S13. The number of times of retry is a number of times of performing retry under the same condition.

When the number of times of retry reaches the predetermined number of times in step S17, the CPU next judges whether or not a timeout of the reading occurs (S18). When the timeout occurs, the CPU notifies the user of the occurrence of timeout (S19), and terminates the processing.

When the timeout does not occur in step S18, the CPU sets a next candidate of the cut-off frequency in the filter module 115 (S20), and repeats the processing after returning to step S13. Specifically, the CPU tries reading again while changing the condition regarding only the cut-off frequency.

Here, explanation will be made on the setting of the cut-off frequency in step S20 using FIG. 5 and FIG. 6. FIG. 5 is a diagram illustrating examples of candidates of the cut-off frequency to be set, and FIG. 6 is a diagram illustrating a setting order of the frequency.

In the barcode reading apparatus in this embodiment, there are prepared six frequencies illustrated in FIG. 5, as candidates of value of the cut-off frequency to be set. As levels of values, an ID of 1 is for high-sensitive reading, an ID of 2 is for normal reading, IDs of 3 and 4 are for low-sensitive reading, and IDs of 5 and 6 are for removing noise of LED illumination.

However, there is a possibility that the noise caused by the blinking of the LED illumination can be removed even if the values of IDs of 5 and 6 are not used. Further, as described above, as the lower frequency is set as the cut-off frequency, the readable resolution and the depth of field becomes the lower. Here, by taking this point into consideration, value of the cut-off frequency is gradually changed from a higher value to a lower value, as illustrated in FIG. 6.

At a first time, the CPU starts the processing with the value of ID corresponding to the reading mode, and until the CPU succeeds in the reading, the CPU sets a smaller cut-off frequency of the next ID. Further, when the CPU succeeds in the reading, the CPU stores the cut-off frequency at that time in step S15, and next, the CPU starts the reading with the stored cut-off frequency.

Further, when the CPU cannot succeed in the reading even if the CPU sets the frequency of the last ID of 6, there is a possibility that the readable resolution or the depth of field is too low, so that the CPU performs the reading while returning the frequency of ID of 1.

Note that it is also possible that the initially set cut-off frequency is set to the highest frequency of ID of 1, regardless of the reading mode.

Through the above processing, it is possible to set a cut-off frequency which is as large as possible, with which the code symbol can be decoded while removing the noise caused by the blinking of illumination. At this time, the user does not have to pay attention to the setting of the cut-off frequency. Therefore, even under the illumination that blinks at a high frequency such as the LED illumination, it is possible to read barcode with the same feeling of operation as that in the case under the illumination with no such blinking.

Further, by storing the set value of the cut-off frequency when the reading is succeeded and using the stored value as the initial value at the time of the next reading, it is possible to reduce the number of times of retry of the reading, resulting in reduced time period from start of the reading to output of the decode result. This is because, when barcodes are continuously read, the environment rarely changes during the reading, so that when the reading condition same as that of the previous time is employed, the possibility that the reading succeeds is high.

However, it is not necessary to design as above, and even if every time the setting is started with the same initial value, a similar effect can be achieved except that the number of times of retry is increased.

Second Processing Example

FIG. 7 and FIG. 8

Figure 7:
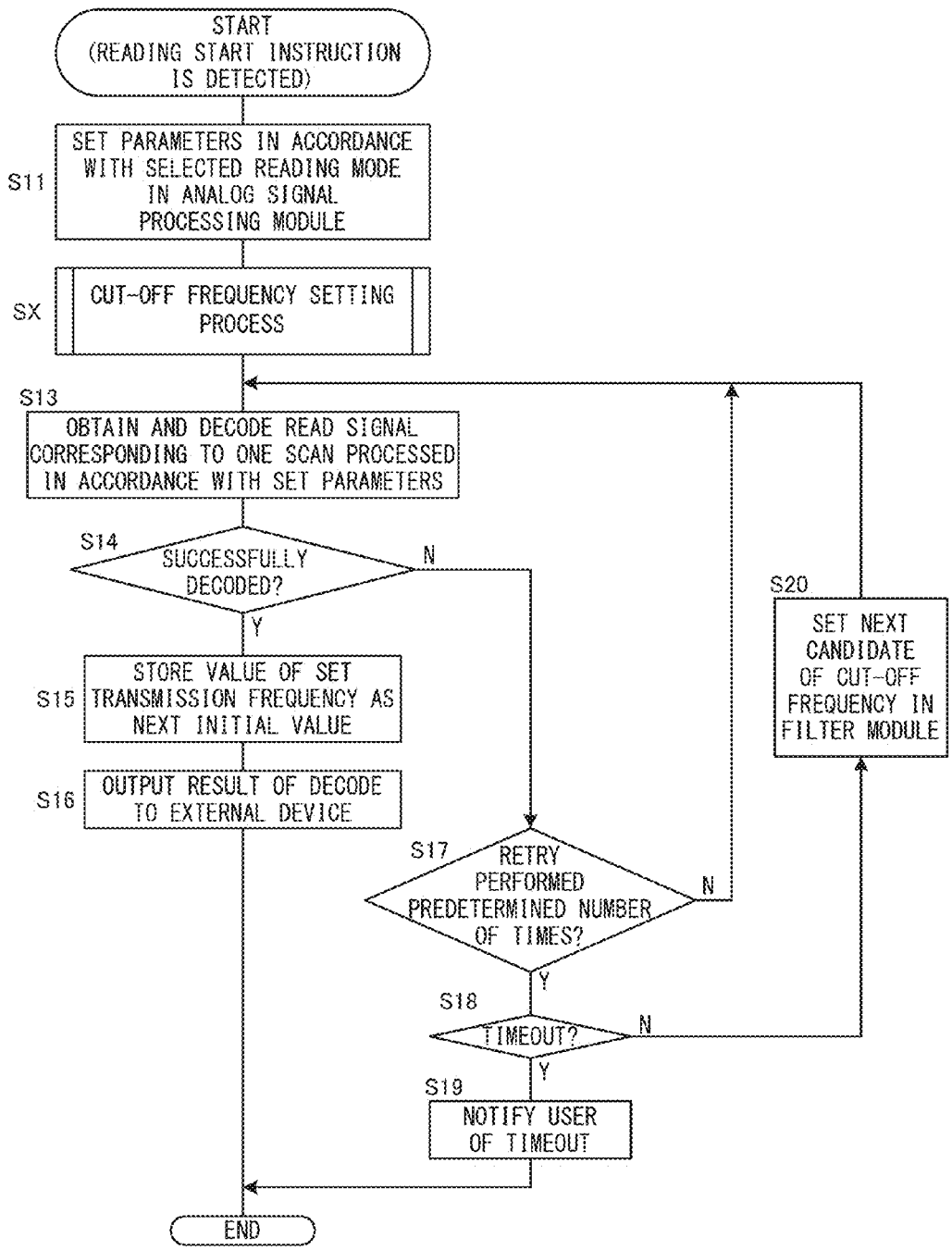
FIG. 7 is a flowchart of a second example of processing executed by the CPU in the control circuit when a reading start instruction is detected.

FIG. 7 illustrates a flowchart of a second example of processing executed by the CPU of the control circuit 122 when a reading start instruction is detected.

This processing is different from the processing of FIG. 4 only in a point that cut-off frequency setting process (SX) is conducted instead of step S12 in the processing of FIG. 4. The same reference numbers of steps in FIG. 4 are given to steps that perform the same processing as that of FIG. 4. Specifically, the second processing example is different from the first processing example only in the method of setting the initial value of the cut-off frequency.

Figure 8:
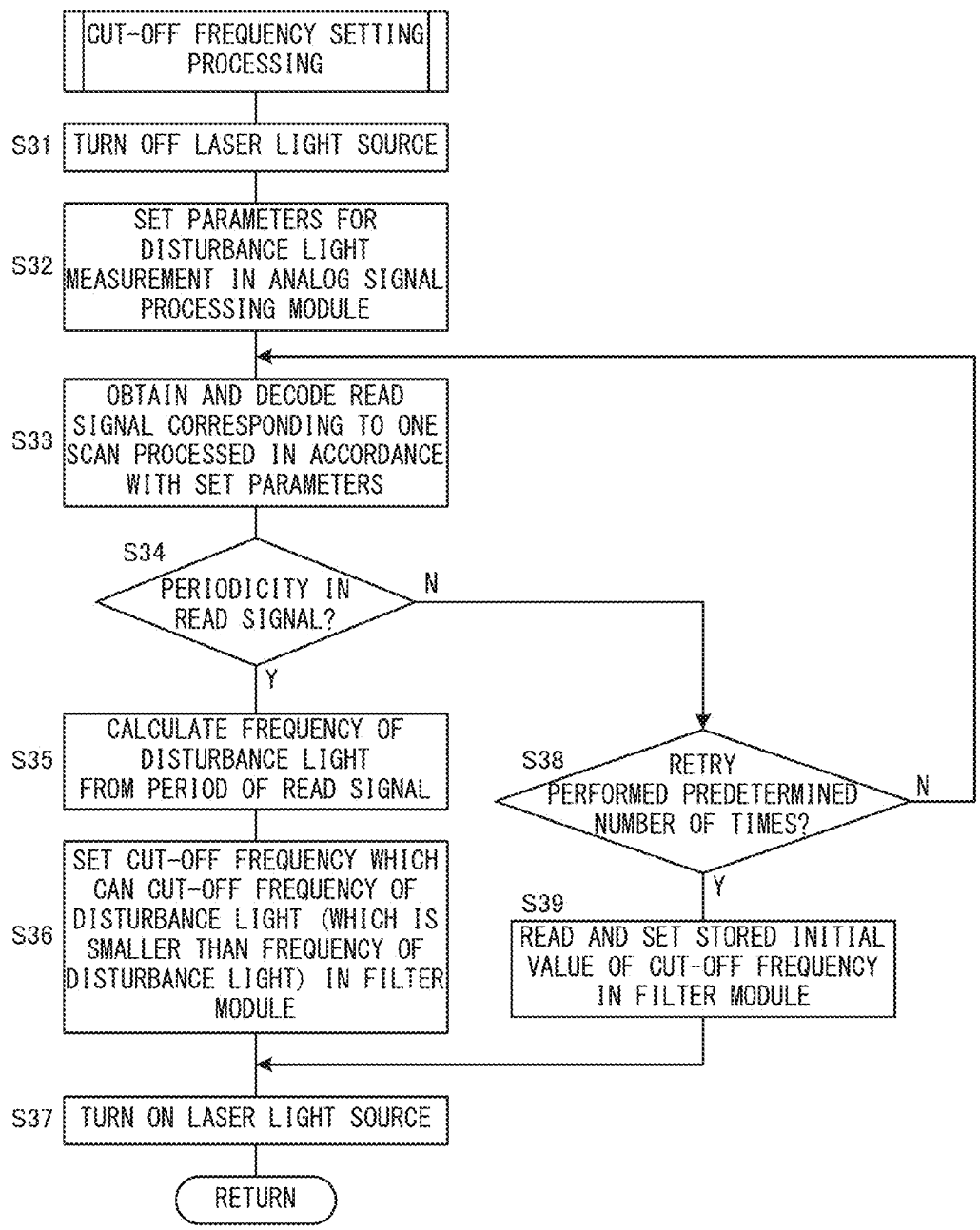
FIG. 8 is a flowchart of cut-off frequency setting processing illustrated in FIG. 7.
Figure 9:
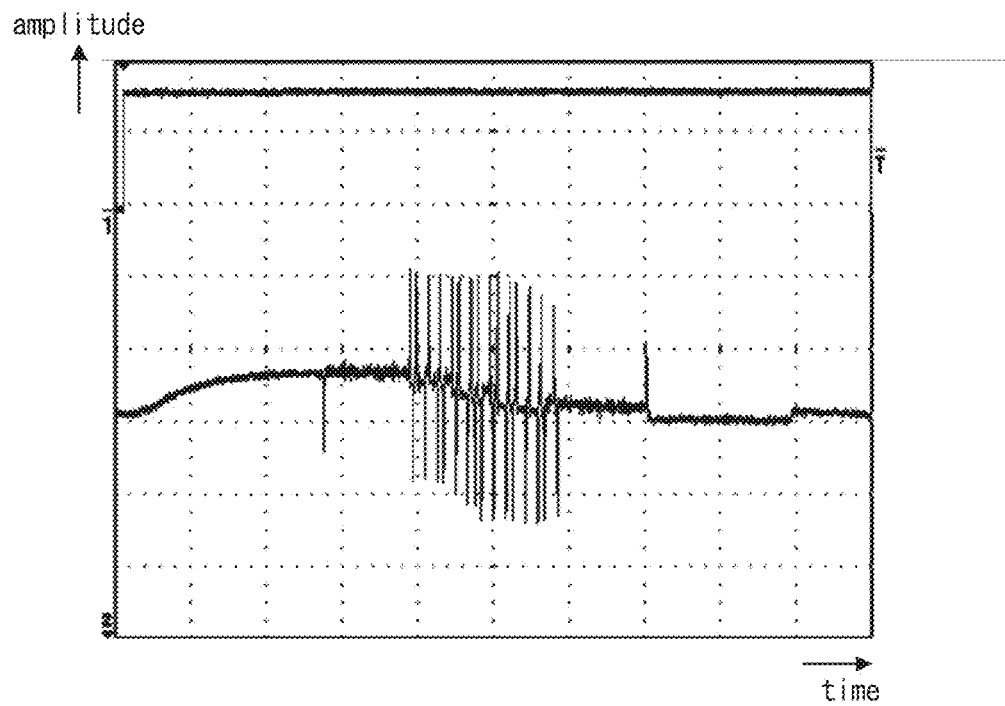
FIG. 9 is a diagram illustrating an example of read signal obtained when a barcode symbol is read under an illumination with no blinking in a period similar to that of a barcode.

FIG. 8 illustrates a flowchart of the cut-off frequency setting processing for setting the initial value.

In this processing, the CPU of the control circuit 122 first turns off the laser light source in the laser scanning module 101 (S31). At this time, the mirror or the like that deflects beam may be kept driving.

Thereafter, the CPU sets parameters for measuring disturbance light in the analog signal processing module 110 (S32). The parameters to be set here are, for example, the cut-off frequency in the LPF 152 and the threshold value for binarization in the binarization module 116, similaly to the case of step S11 in FIG. 4 and FIG. 7. As the cut-off frequency, the CPU preferably sets the largest frequency so that signals at as wide variety of frequency as possible can be picked up.

Further, the CPU obtains a read signal corresponding to one scan processed in accordance with the set parameters (signal after the binarization processing by the binarization module 116) (S33). Here, the laser light source is not lit, so that the scan of the object to be read is not conducted, and light that is incident on the photodiode of the photoelectric conversion module 111 is only external environmental light. Therefore, it can be considered that a peak that reflects an intensity change of illumination appears in the read signal.

Accordingly, the CPU of the control circuit 122 judges whether or not there is a periodicity in the obtained read signal (S34). The judgment can be conducted through processing of, for example, collecting samples of widths of portions of 0 and portions of 1 of the read signal, and checking the smallness of variation between those widths, or the like. Further, the period detected here may be limited to a certain frequency or more such as 10 KHz or more, for example, so that an illumination having a light intensity variation at a high frequency such as the LED illumination is mainly targeted, and a light intensity variation at a low frequency of about 100 Hz in a glow starter-type fluorescent light or the like can be excluded.

Further, when the periodicity is detected in step S34, the CPU calculates a frequency of disturbance light from the detected period (S35). Further, the CPU sets a cut-off frequency which can cut-off the frequency of the disturbance light, that is, which is smaller than the frequency of the disturbance light, in the filter module 115 (S36). Note that when a plurality of frequencies can be set under this condition, the CPU preferably sets the largest frequency among the plurality of frequencies by taking the readable resolution and the depth of field into consideration. Thereafter, the CPU turns on the laser light source in the laser scanning module 101 (S37), and the processing returns to the processing in FIG. 7.

Further, when the periodicity is not detected in step S34, the CPU judges whether or not a retry is already performed a predetermined number of times (S38). When the retry is not already performed the predetermined number of times, the CPU repeats the processing by returning to step S33. When the retry is already performed the predetermined number of times, the CPU reads the stored initial value of the cut-off frequency and set the value in the filter module 115 (S39). Then the CPU turns on the laser light source in the laser scanning module 101 (S37), and the processing returns to the processing in FIG. 7. The processing in step S39 is the same as that of step S12 in FIG. 4. Since it is not particularly necessary to lower the cut-off frequency when no periodicity is observed in the external light, the condition of the previous time in which the reading is succeeded is employed.

According to the above-described processing in FIG. 8, it is possible to automatically set a cut-off frequency with which, when there is periodicity in the disturbance light, the noise due to the periodicity can be cut-off. Therefore, even in a state where the initial value is not stored or in a case where the environment largely differs from that at the time of previous reading, an appropriate cut-off frequency can be set from the beginning, and it is possible to reduce the period of time from start of the reading to output of the decode result. It is of course that, when the initial set value set by this automatic setting is not appropriate, the reading can be performed again by changing the cut-off frequency, similar to the case of the first processing example.

Note that also in the case of adopting the second processing example, when only a short period of time elapses from the previous success in the reading, there is a small possibility that the environment is largely changed, so that it is possible that the processing in FIG. 8 is not conducted, and the stored initial value of the cut-off frequency is read and set in the filter module 115.

Figure 10:
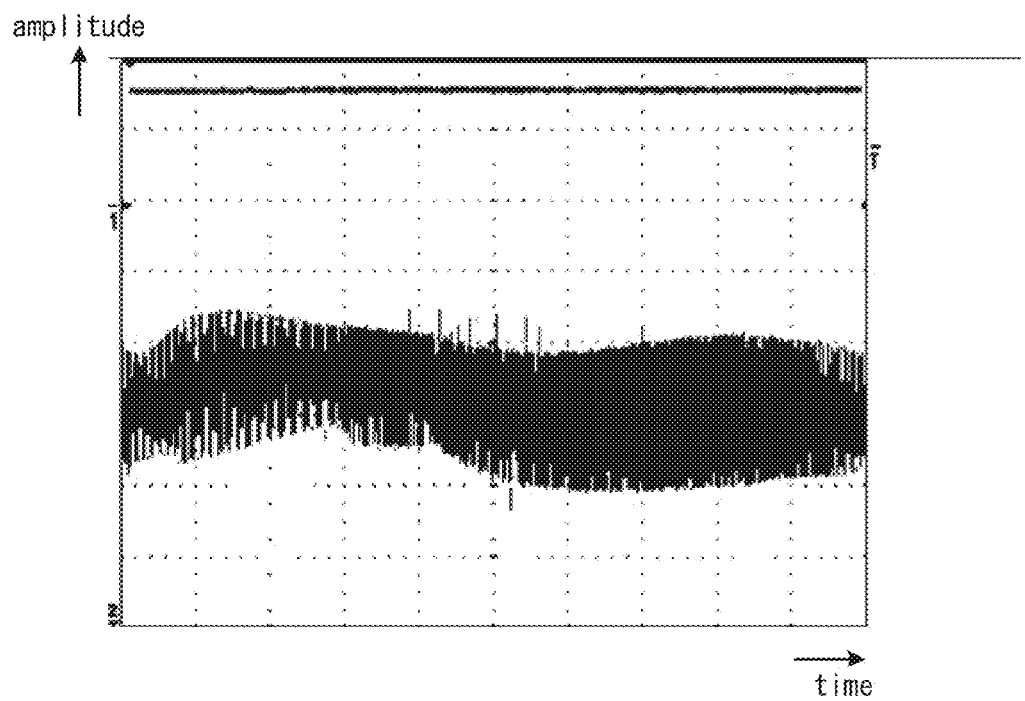
FIG. 10 is a diagram illustrating an example of read signal obtained when a barcode symbol is read under an LED illumination.
Figure 11:
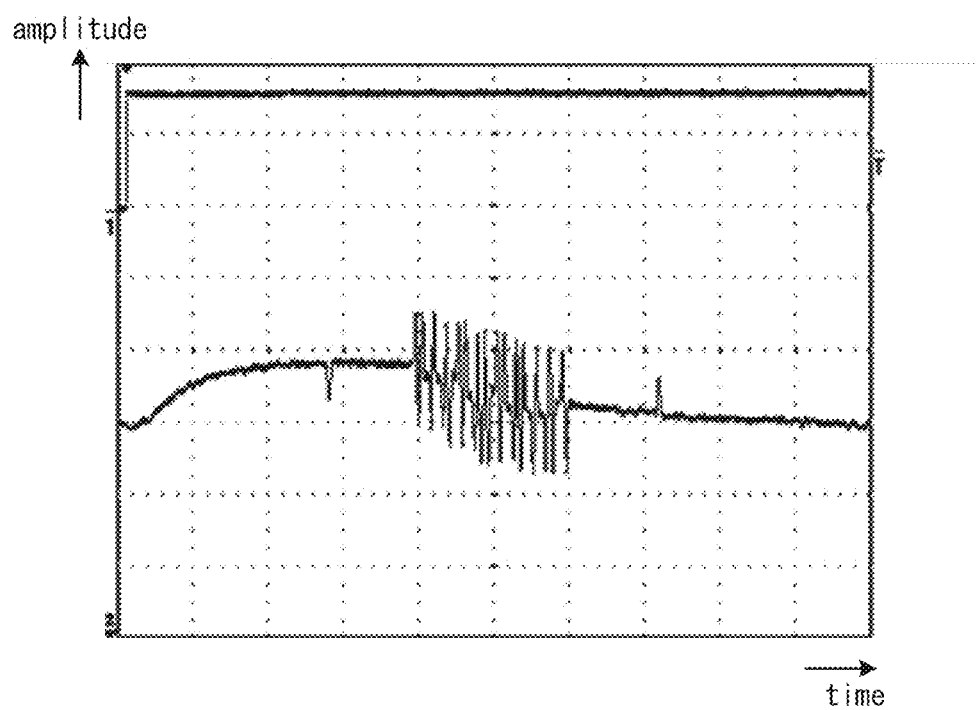
FIG. 11 is a diagram illustrating an example of signal as a result of removing, from the read signal obtained when the barcode symbol is read under the LED illumination, a noise caused by a blinking of the LED illumination.

By performing filter processing using the filter module 115 while setting the value of the cut-off frequency to an appropriate value through the processing in the first or second processing example described above, it is possible to take out a signal including peaks that reflect an arrangement of bars of barcode symbol as illustrated in FIG. 11 from a signal in which a noise of light intensity variation of disturbance light covers and hides the peaks that reflect the arrangement of bars of barcode symbol as illustrated in FIG. 10.

FIG. 10 illustrates an example of output signal of the filter module 115 as a result of processing on a signal obtained by reading a barcode symbol with a resolution of 1.0 mm at a depth of field of 100 mm under the LED illumination by setting the cut-off frequency at 87.6 KHz.

FIG. 11 illustrates an example of output signal of the filter module 115 as a result of performing processing on a signal obtained by reading under the same condition by setting the cut-off frequency at 21.9 KHz.

It can be considered that, if the signal shown in FIG. 11 is obtained, decode in the decoder module 120 is fully possible after binarization using the binarization module 116.

Here, the description of the embodiments is finished, and as a matter of course, configuration of the apparatus, concrete processing steps, type and disposition of the respective modules, numerical values cited as the concrete examples and so on are not limited to those described in the above embodiments.

For example, it is also possible to adopt such construction that a waveform of signal at an arbitrary portion on an upstream of the filter module 115 in the analog signal processing module 110 is once stored, and the stored waveform is read later to conduct post-stage processing thereon. In this case, there is no need to prepare a signal which is different from a signal being a target of analysis for the cut-off frequency setting processing conducted through the processing in FIG. 8. Waveforms in the vicinity of an end portion of the scan in which it is conceivable that there exists no code symbol, can be used for the detection of periodicity of disturbance light.

Further, a program of the invention can be configured as a program for making a computer control the code symbol reading apparatus and execute the reading while changing transmission frequency of the filter as described above. Such a program can be previously stored in a memory of the computer, and in addition to that, such a program can also be provided by being recorded in a CD-ROM or a flexible disk being a recording medium, or in a nonvolatile recording medium (memory) such as an SRAM, an EEPROM, and a memory card, or by being downloaded via a network. Further, by installing the program and making the CPU execute the program, or by making the CPU obtain the program from a memory or a download server and execute the program, it is possible to realize the above-described respective functions.

Further, the above-described configurations and modified examples are applicable also in combination to the extent not inconsistent with each other.

As is apparent from the above description, according to the code symbol reading apparatus, the code symbol reading method and the program of the invention, it is possible to read a code symbol in an inexpensive manner and with good accuracy, even under an illumination that emits pulsed light such as an LED illumination.

Therefore, by adopting the invention, it is possible to provide a code symbol reading apparatus capable of performing reading in a stable manner under a wider range of environments.

REFERENCE SIGNS LIST

100 . . . barcode reading apparatus, 101 . . . laser scanning module, 102 . . . light-receiving optical system, 110 . . . analog signal processing module, 111 . . . photoelectric conversion module, 112 . . . I/V conversion module, 113 . . . preamplifier, 114 . . . AGC amplifier, 115 . . . filter module, 116 . . . binarization module, 120 . . . decoder module, 121 . . . first I/O, 122 . . . control circuit, 123 . . . RAM, 124 . . . nonvolatile memory, 125 . . . second I/O, 126 . . . operation part, 130 . . . gain control signal generation module, 131 . . . peak value detector, 132 . . . reference level setting module, 133 . . . comparator, 151 . . . HPF, 152 . . . LPF

What is claimed is:

1. A code symbol reading apparatus that reads a code symbol on an object to be read by scanning the object, comprising:
   a filter that processes a signal representing a light intensity variation obtained through the scan, transmittance of the filter depending on frequency of the signal, and
   a measuring device that measures a period of light intensity variation of an external light,
   wherein the code symbol reading apparatus sets an initial value of the transmission frequency of the filter based on the period of light intensity variation of the external light measured by the measuring device, and
   wherein the code symbol reading apparatus repeats trial to read the code symbol, while changing a transmission frequency of the filter, until the code symbol reading apparatus succeeds in the reading.

2. A code symbol reading apparatus according to claim 1, comprising
   a memory that stores value of the transmission frequency of the filter which was used when the code symbol reading apparatus succeeded in reading the code symbol before,
   wherein the code symbol reading apparatus uses the value stored in the memory as an initial value of the transmission frequency of the filter.

3. A code symbol reading method for reading a code symbol on an object to be read by scanning the object, comprising:
   a step of performing filtering process on a signal representing a light intensity variation obtained through the scan, transmittance of the filtering process depending on frequency of the signal;
   a measuring step of measuring a period of light intensity variation of an external light,
   wherein an initial value of the transmission frequency of the filter is set based on the period of light intensity variation of the external light measured in the measuring step, and
   a step of repeating trial to read the code symbol, while changing a transmission frequency of the filtering process, until the reading is successful.

4. A code symbol reading method according to claim 3, comprising
   a step of storing, into a memory, value of the transmission frequency of the filtering process which is used when the reading is successful,
   wherein the value stored in the memory is used as an initial value of the transmission frequency of the filtering process.

5. A non-transitory machine-readable medium containing program instructions executable by a computer and enabling the computer to control a code symbol reading apparatus and to make the code symbol reading apparatus perform the code symbol reading method according to claim 4.

6. A non-transitory machine-readable medium containing program instructions executable by a computer and enabling the computer to control a code symbol reading apparatus and to make the code symbol reading apparatus perform the code symbol reading method according to claim 3.

\* \* \* \* \*